FIG. 1

INVENTOR.
CORNELIS LANGEWIS
BY James E. Toomey
ATTORNEY

INVENTOR.
CORNELIS LANGEWIS
BY James E. Cooney
ATTORNEY

INVENTOR.
CORNELIS LANGEWIS
BY
James E. Cooney
ATTORNEY

FIG.9

United States Patent Office
3,314,274
Patented Apr. 18, 1967

3,314,274
APPARATUS FOR FORMING CUP-SHAPED MEMBERS
Cornelis Langewis, Walnut Creek, Calif., assignor to Kaiser Aluminum & Chemical Corporation, Oakland, Calif., a corporation of Delaware
Filed Jan. 23, 1964, Ser. No. 339,814
16 Claims. (Cl. 72—349)

This invention relates to an apparatus for forming cup-shaped metal containers. More particularly, it is concerned with providing a novel apparatus for forming elongated cup-shaped metal containers such as those used to contain food products and the like.

It is the primary purpose of this invention to provide an improved apparatus for forming cup-shaped metal containers of the type referred to from starting blanks which preferably have the configuration of shallow metal cups.

These and other objects of the present invention will become apparent from a review of the following detailed description when taken in conjunction with the accompanying drawings which illustrate a preferred embodiment of the invention and wherein.

Although the apparatus will be described with reference to a single piece of equipment or machine it is to be understood that individual pieces of equipment or machines can be arranged in batteries or groups whereby they can all be operated from a common power source and that the apparatus or machine can be arranged in vertical and inclined planes as well as horizontal planes.

Figure 1:
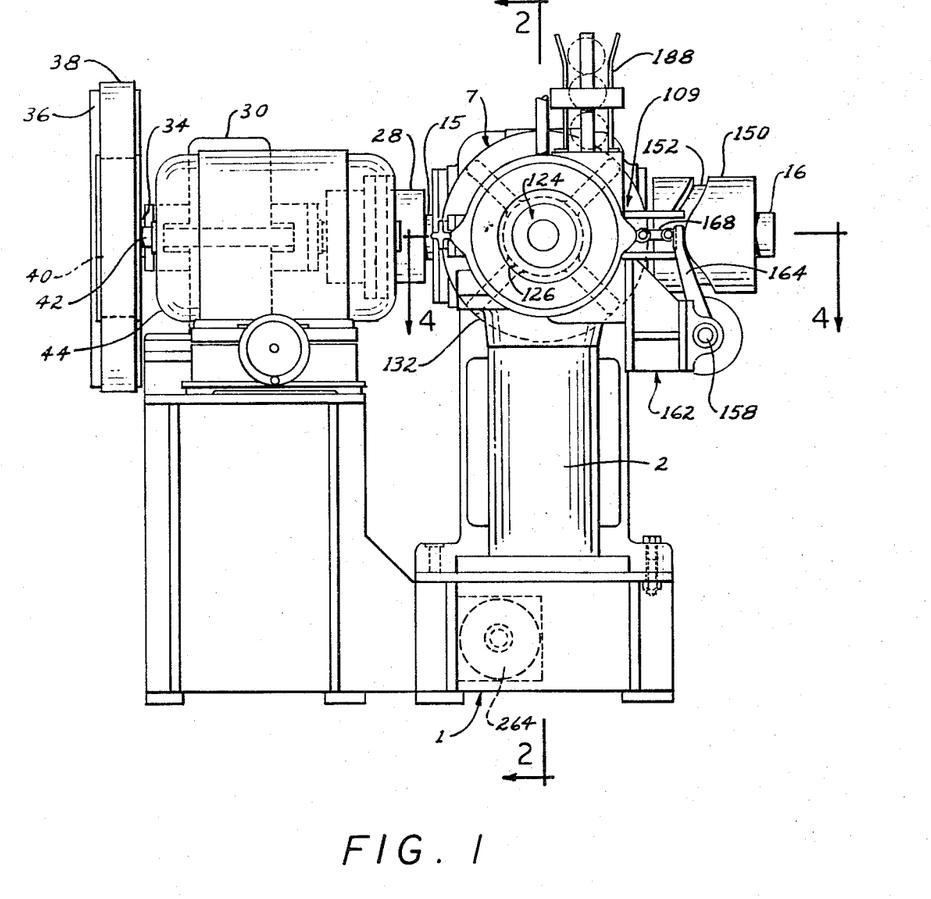
FIG. 1 is an end elevational view of the improved container fabricating apparatus of the instant invention.
Figure 2:
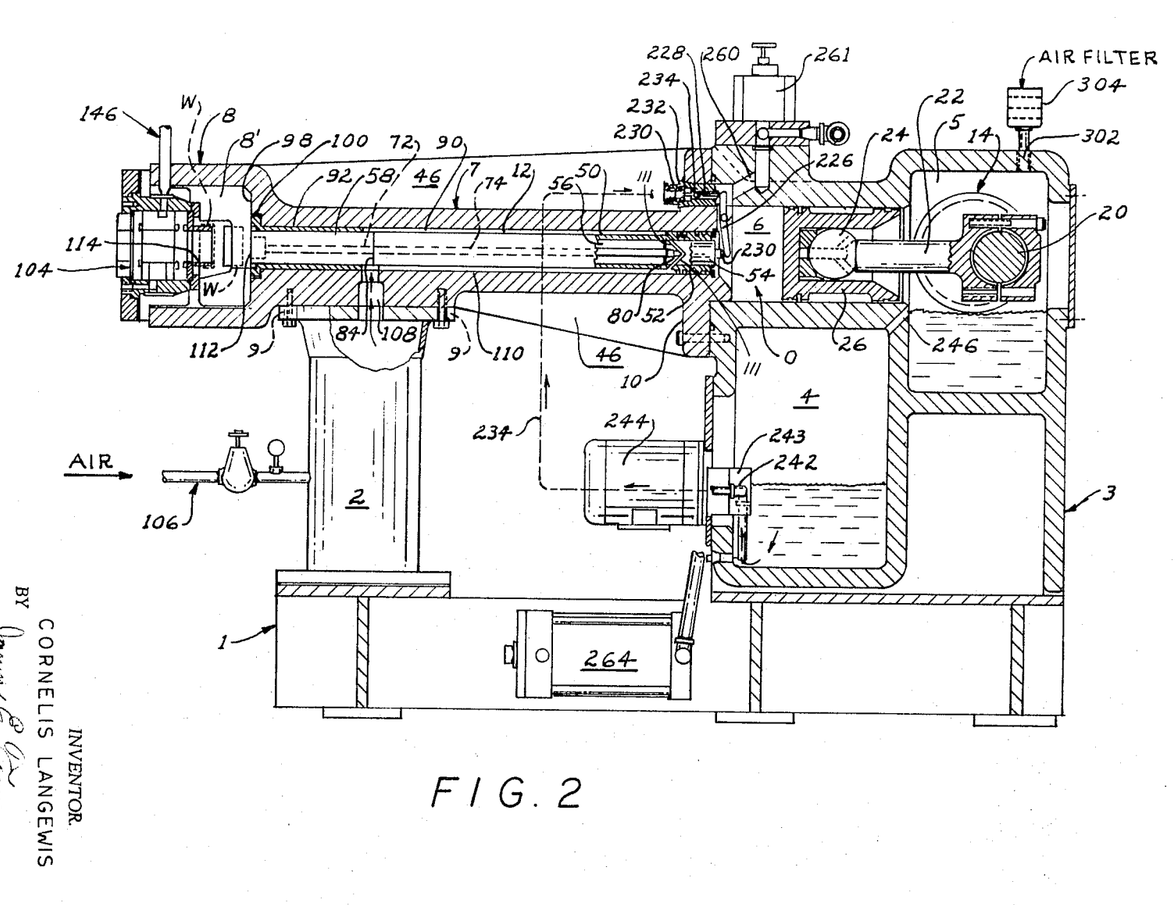
FIG. 2 is a cross-sectional view of the apparatus shown in FIG. 1 when taken generally along line 2—2 thereof with parts removed and with other parts broken away.
Figure 3:
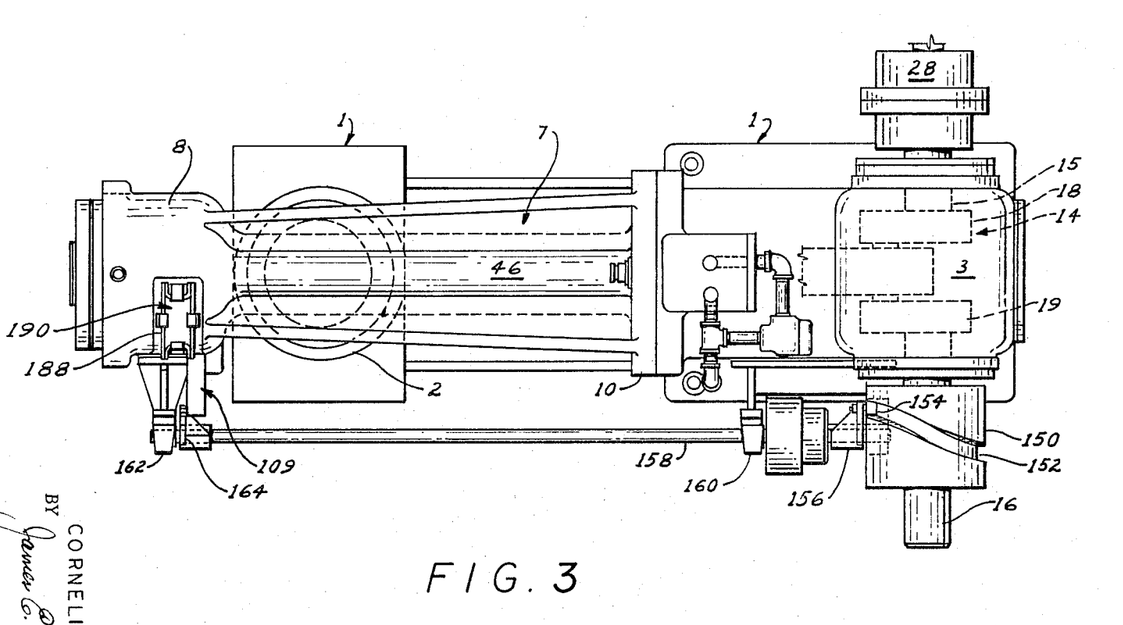
FIG. 3 is a top plain view with parts removed of the apparatus shown in FIG. 1.

With further reference to the drawings and in particular FIGS. 1–3, the apparatus of the instant invention is generally comprised of a conventional base support 1. Mounted upon this base support at one end of the apparatus is a cylindrical leg 2 and at the other end of the apparatus a large cast housing element 3. Leg 2 comprises a large cylinder which is used as an air accumulator to be described in more detail hereinafter. The cast housing 3 is made in such a fashion as to be provided with a lower chamber 4 and an upper chamber 5. Chamber 5 communicates with a secondary chamber 6. Affixed to the cast housing element 3 is an elongated barrel-like member 7 provided at one extremity with an enlarged portion or head 8 having a hollowed-out opening or tool pack-receiving chamber 8'. The barrel-like member 7 is suitably affixed to the top of the air accumulator member 2 by means of machine bolts 9 and to housing 3 by means of the flange 10 which is bolted directly to the cast housing 3. As indicated in FIG. 2, hollow interior or bore 12 of the barrel 7 communicates with the secondary chamber 6 formed in the cast housing element 3. Disposed within the main chamber 5 of the cast housing element 3 is a crank element 14, the opposing sides of which are affixed, respectively, to a journal shaft 15 and a cam shaft 16 by virtue of the crank arms 18 and 19, respectively. The crank pin 20 disposed between and secured to the crank arms 18 and 19 has a piston rod 22 suitably affixed thereto. Piston rod 22 is provided with a generally spherical head 24 which snugly but loosely fits inside of the large actuating piston 26 disposed within a secondary chamber 6 in a manner well-known in the art. The crank element 14 is actuated by the journal shaft 15 which is connected through suitable gear trains disposed in the gear boxes 28 and 30 to the drive shaft 34 provided with a driving pulley 36. As indicated in FIG. 1, driving pulley 36 in turn is driven by the belt 38 which is trained about the small driving pulley 40 affixed to the shaft 42 driven by the electric motor 44.

From the above description, it will now be obvious by reference to FIGS. 1–3 that operation of the motor power source 44 causes actuation of the crank element 14 and a driving of the piston rod 22 and the main driving or actuating piston 26 forward or to the left from an initial preselected starting position as viewed in FIG. 2. The return movement of driving or actuating piston 26 is controlled by an air or fluid medium disposed in the hollow interior 12 of the cylinder barrel 7 in a manner to be described more fully hereinafter.

Disposed within the hollow interior 12 of the cylindrical barrel 7 which can be advantageously provided with reinforcing ribs 46 formed integrally with the barrel 7 is an elongated hollow piston rod 50. One extremity of piston rod 50, that is, the extremity located most closely adjacent the secondary chamber 6, is provided with a working piston 52. This piston can, if desired, as indicated in FIG. 2, be made integrally with the piston rod 50. A plug 54 is rigidly disposed within the hollow interior 56 of the piston rod 50 for the purpose of sealing off the hollow interior of this rod adjacent working piston 52. Affixed to the other extremity of the hollow piston rod 50 is a punch or ram 58 the outer surface of which includes an annular recessed portion 59 the purpose of which is set forth more fully hereinafter. Forming ram or punch 58 is suitably secured to the hollow piston rod 50 by means of a pin element 60. As indicated particularly in FIG. 4, the pin element 60 is provided with an enlarged head end portion 62 which is welded in the area 64 to the inside of the hollow piston rod 50. Pin 60 is further provided with a threaded recessed portion 66 at the forward end thereof for receiving the bolt 68 provided with the bore 70. Bore 70 communicates with the bore 72 in the pin element 60 and bore 72 in the pin element 60 also communicates with the hollow tube 74 mounted inside the hollow piston rod 50. The opposing ends of the tube 74 are held in place by being anchored within the opening 76 in the pin element and within a suitable recess or opening 80 in the plug 54.

The forming ram 58 is affixed to the hollow piston rod 50 in the following fashion, reference being made to FIGS. 4 and 5 of the drawings. A bolt means 68 is employed. Bolt means 68 is provided with a head 78 which is adapted to rest in abutting relationship on the shoulder element 80' of the forming ram 58. When the bolt 68 is drawn up tightly, the bolt being turned by means of a suitable instrument inserted in the holes 82 of the bolt head, the forming ram 58 will be abutted against the end 84 of the hollow piston rod 50 and drawn tightly thereagainst.

In order to facilitate the disconnection and withdrawal of the forming ram 58 from the cylindrical piston rod 50, an anchoring clip or fitting 86, which has a somewhat horseshoe shape, is removably disposed adjacent the head 78 of the bolt 68 within the recess 88 of the forming ram 58. It will thus be seen that when the bolt 68 is turned in the proper direction, whereby it becomes loosened from the pin 60, the bolt head 78 will bear against the clip 86, so as to readily free ram 58 from the hollow piston rod 50.

Interposed between the inside wall 90 of the bore 12 of barrel 7 and the ram 58 is a tubular sleeve or bearing member 92. This sleeve or bearing member is anchored by suitable bolt means 96 to the barrel 7, the bolt means 96 being insertable within suitable openings in the flanged portion 98 of the sleeve 92. The flange portion 98 of sleeve 92 fits within the annular stepped portion 100 of the cylinder barrel 7.

Bearing sleeve 92 advantageously acts as a guide for the forming ram or punch 58, as well as the hollow piston rod 50, as each of these elements reciprocates within the housing 7 during the fabrication of a container. This sleeve moreover advantageously acts to maintain proper axial alignment between the forming punch 58 and the dies to be described later whereby off-centering of the axis of the punch with respect to the axis of the dies is minimized and for all practical purposes eliminated.

As indicated above, the forward movement or movement of the punch and the hollow piston 50 to the left, as viewed in FIG. 2, is effected by means of the crank assembly 14 and the actuating piston 26 as the piston 26 during its forward movement tries to compress the fluid, such as oil O disposed within the secondary chamber, or receptacle 6 in the housing element 3, the fluid advantageously acting as a fluid coupling between pistons 26 and 52. As the ram or punch 58 is moved forward under the action of fluid O and pistons 26 and 52, it picks up a blank or workpiece which is preferably in the form of shallow cup-shaped member W and moves it through the die assembly or tooling 104 in the manner to be described more fully hereinafter.

The withdrawal of the forming ram 58 from the die assembly 104 and its return movement to the right, as viewed in FIG. 2, along with the hollow piston rod 50 to their initial starting positions is brought about in the following manner. As indicated previously, the hollow cylinder 2 comprises an air receptacle or accumulator with air being fed into this receptacle from the piping 106 under constant pressure. The air is forced from the receptacle 2 upwardly through the opening or orifice means 108 and then into the space 110 which exists between the hollow piston rod 50 and the bearing sleeve 92 and the piston 52 located at the one end of the piston rod 50. During the forward movement or the movement to the left of punch 58, as viewed in FIG. 2, the air within the space 110 in the cylinder barrel 7 and the accumulator 2 is compressed. It is to be further observed that as the working piston 52 is forced backward on its return stroke by the air, it causes the withdrawal of the fluid that has previously been displaced into the opening 110 on the other side of the piston 52 back into the secondary chamber 6. A suitable bleed-off arrangement is provided at the working piston end of the rod 50 by convergent pasageways 111 which are shown as extending generaly radially inward from the outer surface of the piston 52 at its inner end and through the plug 54 to intersect with the opening 80 within the plug 54 which also communicates with the interior of tube 74. The compressible air within the space 110 is bled-off in the operation of the apparatus as subsequently set forth through the intercommunication of the passageways 111, opening 80, hollow tube 74, through the pin element 60 and bolt 68 by means of the bores 72 and 70 to the forward end of the punch 58. This re-entry of fluid back into chamber 6 is made possible by virtue of the fact that the crank assembly is, during this time, operating to dispose piston head 24 in a rearward position whereby it offers no resistance to the backward or return movement of piston 26. As the fluid initially evacuated from chamber 6 upon the forward movement of actuating piston 26 is moved back into chamber 6 under the influence of the now air-actuated piston 52, it causes the return movement of the actuating piston 26 to its preselected starting position. In effect piston 52 is hydraulically motivated in one direction and air actuated in the reverse direction with the fluid disposed within the chamber 6 advantageously acting as a fluid coupling between the driving piston 26 and the piston 52. Some of the advantages of this fluid coupling arrangement are that it works as a stroke multiplier. Due to the difference in the cross-sectional areas of piston rod 50 and actuating piston 26 piston rod 50 travels many times the traveling distance of piston 26. Secondly inasmuch as no side loads are imposed on rod 50, it is easier to keep it and ram 58 in alignment with the dies. By being able to exhaust the oil, as will be indicated hereinafter in chamber 6, the action of rod 50 can be stopped instantaneously in case of malfunction of the apparatus and thus prevent any serious damage to the apparatus. With further reference to the drawings, and in particular FIGS. 2, 4 and 5, the tool pack or die assembly 104 through which a shallow cup-shaped starting workpiece W is drawn in such a fashion that it is reverse drawn, that is, it turned inside out and then ironed, will now be described.

A shallow cup-shaped workpiece W is advantageously fed into the cavity or chamber 8 at the forward part of the machine by the feed assembly or mechanism 109 or in such a fashion that the bottom of the workpiece is first engaged by the forward end 112 of the punch 58 and then placed over the initial die 114 of the die assembly which comprises a reverse redraw die, which will be hereinafter simply referred to as a reverse draw die. At this juncture of the operation, the workpiece fits loosely but snugly over the forward or bulbous nose portion 116 of this reverse draw die 114. As indicated, particularly in FIG. 4 of the drawings, the die assembly comprises a reverse draw die 114 and a plurality of ironing dies such as ironing die 118 provided with a guide element 118', a spacer member 120, a final ironing die 112 and a stripper mechanism 124 of the type shown in the co-pending application Ser. No. 276,632, filed Apr. 26, 1963, of Henry G. Henrickson et al. The various elements 114, 118, 120, 122 and 124 in effect form a removable die assembly or tool pack which is held in place or secured to the barrel portion 7 of the apparatus by means of a flanged annular retainer ring 126. As indicated in FIG. 4, one end portion of this ring is secured by bolt means 130 to an inner retainer or annulus 128. The front stepped portion of the retainer ring 126 is sandwiched in and locked between a spacer 132 and an annular cap 134 with the cap 134 and spacer 132 being fixedly mounted upon the barrel portion 7 of the apparatus by suitable bolt means 136. From the above description, it will be obvious that the securing of the ring 126, cap 134 and spacer 132 to the housing will in turn cause a rigid affixation of the die assembly 104 to the barrel portion 7 of the apparatus. As the cup-shaped workpiece W is picked up by the ram 58 from the feeder apparatus 109, it will be presented to the first die or the reverse draw die 114 located at the entry end of the die assembly in such a fashion that the cup-shaped workpiece W will fit snugly over the forward or nose portion 116 of the reverse draw die. As indicated in FIGS. 4 and 5, the continued forward movement of the ram or punch 58 against the bottom of the workpiece will effectively cause the workpiece to change its cross-sectional dimension and to be turned inside out and back upon itself as it passes through the central aperture 140 of the reverse draw die 114 and with the ram 58 now engaging the inside of the bottom B of the workpiece rather than the outside of the bottom B workpiece. Progressive movement of the ram 58 and the workpiece W through the first ironing die 118 causes the wall 119 of the workpiece to be elongated or ironed and thinned the proper amount. Continued movement of the ram 58 and workpiece W through the second ironing die 122 causes the wall 119 of the workpiece to be further ironed and thinned the requisite amount to form the desired seamless can body. Finally, the workpiece is passed by the ram through the stripper mechanism 124 and as the ram retracts from the die assembly 104 the workpiece W is engaged by the stripper mechanism and suitably stripped from the punch 58. During the removal of the formed workpiece W from the forward end of the punch 58 by the stripper mechanism 124, the aforedescribed bleed-off means expediently assists the removal of the workpiece W in conjunction with the stripper mechanism 124. The bleed-off of compressed air exiting from the bore 70 of the bolt 68 beneficially reduces the vacuum that would occur between the workpiece and punch when the workpiece W is removed from the punch 58.

Figure 4:
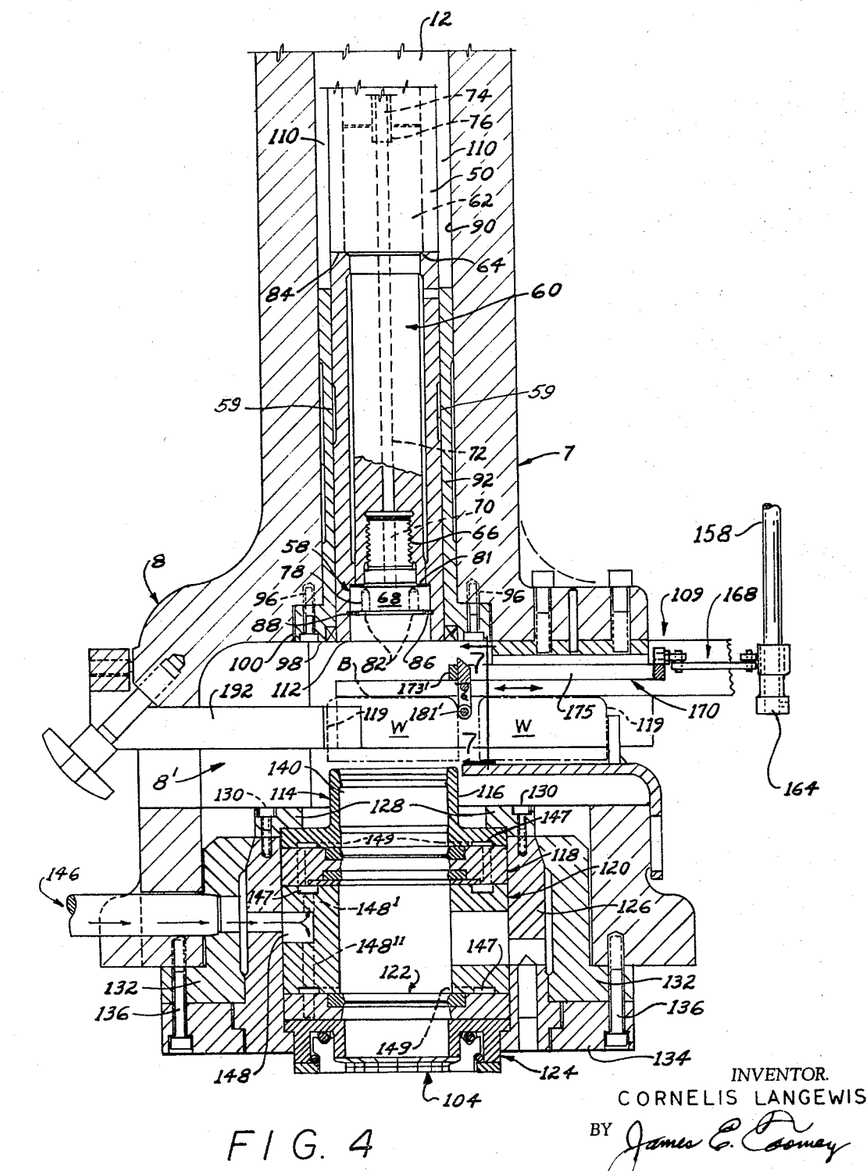
FIG. 4 is a broken sectional view of a portion of the apparatus shown in FIG. 1 with parts removed and when taken generally along line 4—4 thereof.

It will be noted, particularly with reference to FIG. 4 of the drawings, that portions of the die assembly 104 are advantageously lubricated by means of oil which enters the die assembly 104 through the main inlet pipe 146 from which it then passes through the opening 148 in the retainer sleeve 126, lines 148' and 148" in spacer ring 120, annular openings 147 and finally out through conduit lines 149 in the various die elements 118 and 122.

Moreover, the length of the ram 58 is so proportioned relative to the length of the workpiece W to be formed whereby as the ram and workpiece W are passed through die elements 114, 118 and 122 the recessed portion 59 of the ram allows a thickening to take place in the wall of the workpiece adjacent the open end thereof that is used to advantage in subsequent container finishing operations such as flanging the end of the container.

The means for feeding the initial shallow cup-shaped blanks or workpieces to the chamber 8' in the barrel 7 of the apparatus and intermediate the ram and die assembly 104 will now be described, reference being made particularly to FIGS. 1, 3, 4, 5, 7 and 9 of the drawings. As indicated, particularly in FIGS. 3 and 4, a cam 150 is affixed to the end of crank assembly shaft 16 which protrudes from the cast housing 3. Cam 150 is provided with a recessed cam track 152 within which is disposed a cam follower or roller 154. Cam follower 154 is mounted by means of the bracket element 156 on the elongated oscillating shaft 158. Shaft 158 is affixed to the cast housing 3 by means of the bearing support element 160 and to the enlarged portion of the barrel housing 7 by means of the supporting bracket 162. Affixed to the shaft 158 adjacent bracket 162 is a feeder actuating arm 164. Arm 164 connected to a cup-feeder frame assembly 170 by means of the linkage 168 acts to attach frame assembly 170 to the oscillating shaft 158. As indicated particularly in FIG. 9 cup-feeder frame assembly 170 is generally comprised of a rectangular slide or frame 170 provided with short sides 173 and 173' and long sides 174 and 175. The long sides 174 and 175 of the frame are respectively receivable within the trackways 176 and 177 in the elongated support elements 178 and 179 which project inwardly into the recess 8' of the barrel housing 7. Supporting elements or plates 178 and 179 are held in place by means of the U-shaped element 180 to which elements 178 and 179 are attached by bolt means 181 when the U-shaped element 180 is affixed by the bolt means 182 to the barrel housing 7 in the manner indicated in FIGS. 5 and 7 of the drawings. Slide or frame 170 is provided at the innermost extremity thereof with a roller 181' pivotally mounted on the trunnion extensions 183 formed integrally with the top and bottom sections 174 and 175 of the slide 170. Roller 181' is freely mounted in the U-shaped member 184 which is resiliently journaled by pin 185 and spring 182 to the journal arms or trunnion extensions 183. It will be observed, as indicated particularly in FIGS. 5 and 9, that the web portion 184' of the U-shaped member 184 is somewhat tapered. The reason for this is as follows. As the slide moves forward into the interior chamber 8' of the barrel housing 7 by virtue of the oscillating movement of shaft 158 as determined by the cam 150, the roller 181' contacts a cup-shaped blank W. This blank has been allowed to drop by gravity down through the blank feed 188 and the opening 190 in the top portion of the enlarged section 8 of the barrel-like member 7 within which the die assembly is disposed and onto the bottom support element or plate 179. Roller 181' engages blank W in such a fashion that it engages the side wall 119 thereof and forces the blank W inwardly as indicated in FIGS. 4 and 5 and into the pocket 192 of the retaining and centering arm 192', whereby the axis of the bottom of the blank W is aligned with the central axis of the forming ram 58. As the cup slide 170 is then retracted outwardly, roller 181 lightly brushes and slides past the bottom of another cup-shaped blank which in the meantime has been dropped from the blank feed 188 through the opening 190 and onto the support surface 179, since the U-shaped member 184 is freely although resiliently mounted in trunnion supports 183 as noted above. As the roller holder 184 reaches a stop pin 196 affixed to the support plates 178 and 179 at the end of the return movement of slide 170, stop pin 196 engages and forces roller holder 184 and roller 181' into a cup-engaging position or into a position whereby the roller 181' is then located in a substantially parallel position with respect to the side wall 119 of the blank W under the slight pressure and urging of spring 182.

The mechanical interlock employed between the cup feeder or slide 170 and crank assembly 14, such as the oscillating shaft 158, arm 164 and the roller 154 mounted in the cam track 152 of the cam 150 insures proper feeding of a cup-shaped workpiece W to the punch 58 and proper and accurate correlation of the feeding movements of the cup slide 170 with the movements of other parts of the apparatus, such as the ram 58 and the working piston 52 therefor.

Figure 5:
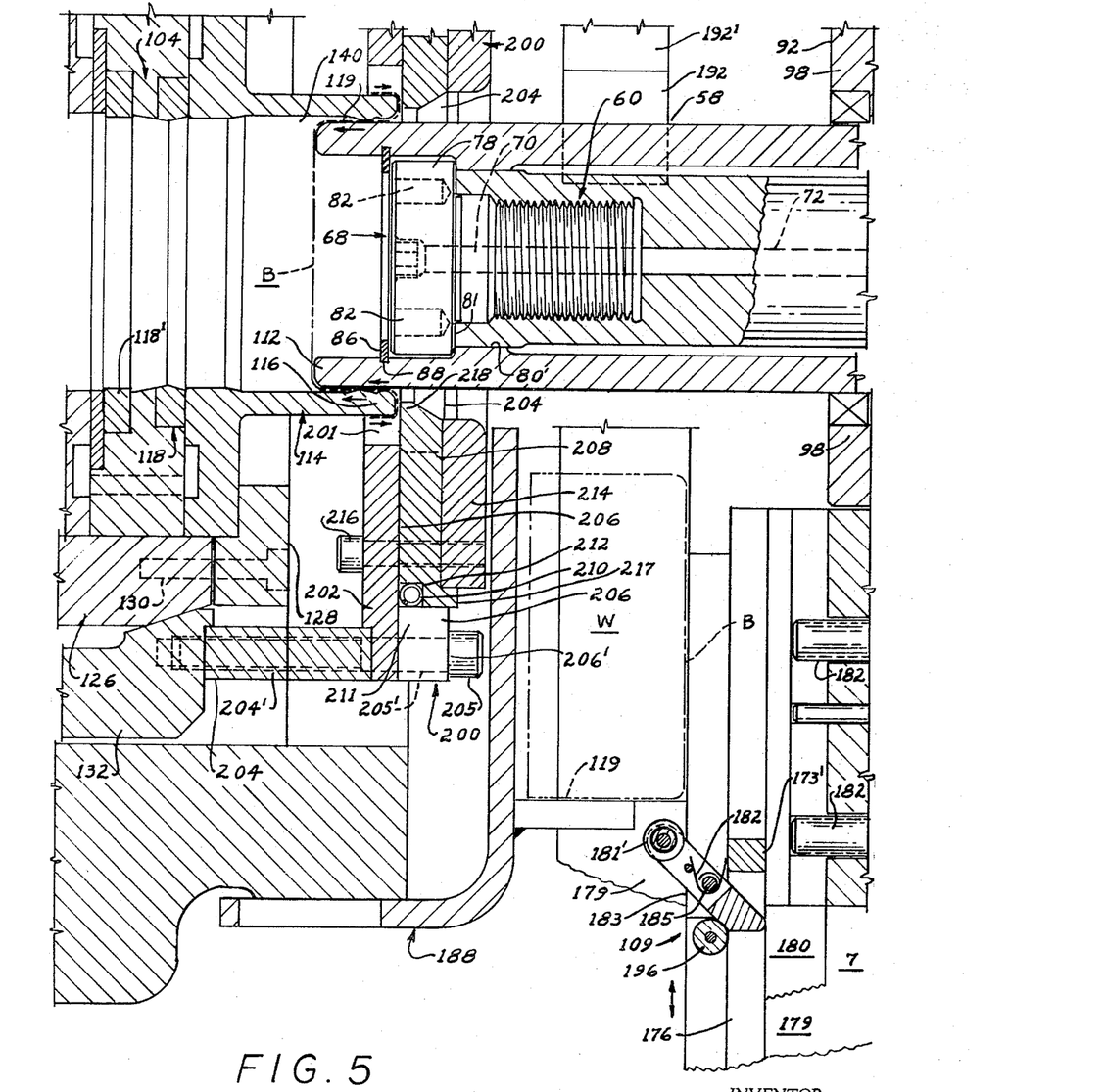
FIG. 5 is an enlarged partial sectional view of a portion of the apparatus shown in FIG. 4 and with parts added.
Figure 6:
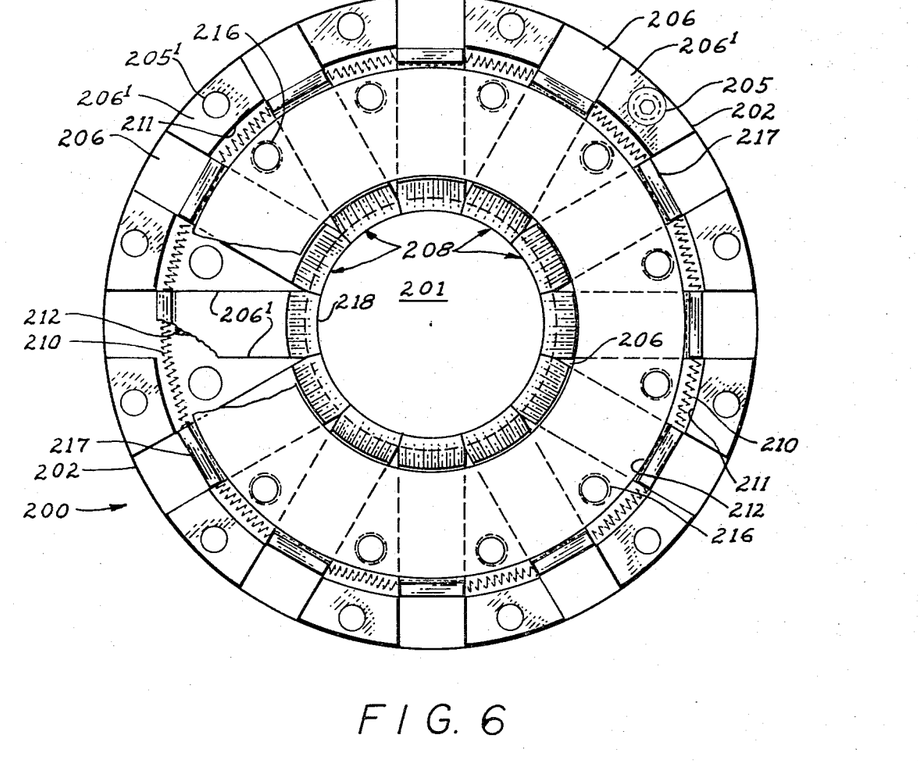
FIG. 6 is a broken front elevational view of the reverse draw die attachment for the apparatus of the instant invention.
Figure 7:
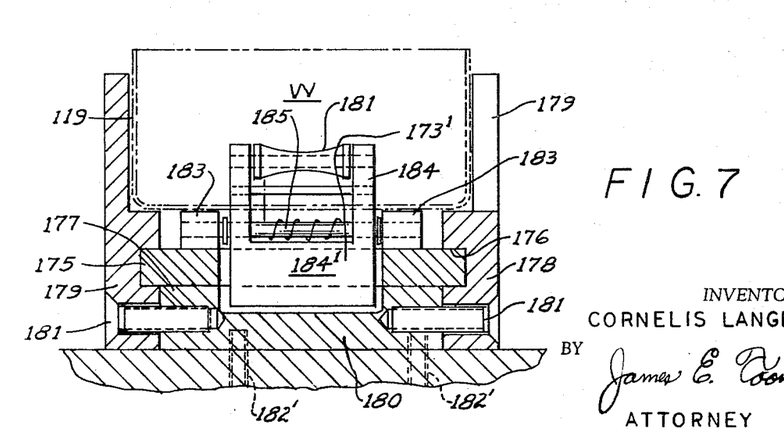
FIG. 7 is a sectional view of a portion of the apparatus shown in FIG. 4 when taken generally along the line 7—7 thereof with parts removed and rotated 90° clockwise.

In a further advantageous embodiment of the invention, reference being made particularly to FIGS. 5 and 6, a unique arrangement can be employed, if desired, to prevent a serious distortion or wrinkling of the cup-shaped workpiece W during the time the redrawing thereof is initiated and effected by the redraw die 114. In order to accomplish this, it is contemplated that a blank guiding or wiper assembly 200 be employed, wiper assembly 200 being disposed adjacent to and as indicated in the drawings in advantageous overlapping relationship with the entry end of the redraw die 114. This wiper assembly 200 is generally comprised of an annular plate 202 provided with opening 201 and held in suitably spaced relationship with respect to the reverse drawing die 114 by means of the retainer ring 204 and bolt elements 205. The bolt elements 205 extend through aligned openings 205' in annular plate 202 and openings 204' in the retainer and spacer ring 204 and then into the die assembly sleeve and spacer element 132 that is affixed to the housing 7. Ring 202 is milled out whereby it is provided with a plurality of radially disposed slots 206 on the outer face thereof separated by roughly triangular solid portions or islands 206' having a somewhat L-shaped configuration in cross section. Individual anti-wrinkling or blank wiper blades 208 are loosely held in these slots 206 by means of the annular retainer spring 210 which bridges the slots 206 and fits within the grooves 211 of the islands 206', while at the same time remaining seated in the stepped recess 212 located in the back of each wiper blade 208. Blades 208 are held in position as well as close together within grooves or slots 206 by a keeper ring 214 provided with bolt means 216 which pass through aligned openings in ring 214 and the islands 206' of plate 202. The ledge element 217 on the individual wiper blades 208 engage the bottom keeper ring 214 and limit the inward movement of these blades.

By virtue of the above arrangement, it will be observed that the wiper blades 208 can move freely in and out a limited distance and still be held in a biased condition by means of spring 211 against a cup-shaped blank being fed to redraw die 114. It will also be noted that these wiper blades 208 are individually and independently mounted such that the movement of one does not depend upon the movement of the other and such that each blade or wiper element 208 will contact a different portion of a blank W.

The wiping surfaces or tips 218 of blades 208 advantageously act as baffles or guards for the bottom and wall of the blank W and prevent the bottom and wall of the blank from flaring outwardly or being diverted away from the rounded surfaces of the bulbous nose portion 116 of the redraw die as the blank is turned inside out and reduced in cross section on the redraw die by the action of the ram 58 as it advances the blank through the redraw die 114. Diversion of the blank bottom or wall outwardly away from the nose portion 116 of the die 114 as the metal of the blank is caused to flow across the surface of nose portion 116 can cause undesirable wrinkling or distortion of the metal in the bottom and sidewall of the blank. Such a distortion or wrinkling would, among other things, later inhibit the satisfactory and desired thinning and elongation of the wall of the workpiece as it is thereafter presented to and advanced through the ironing dies 118 and 122 by the ram 58. Blade elements 208 are spaced sufficiently from redraw die 114 whereby the blades 208 will not exert any pressure on the blank wall or bottom, the blade elements acting only to wipe the blank lightly and prevent diversion of the metal outwardly.

Figure 8:
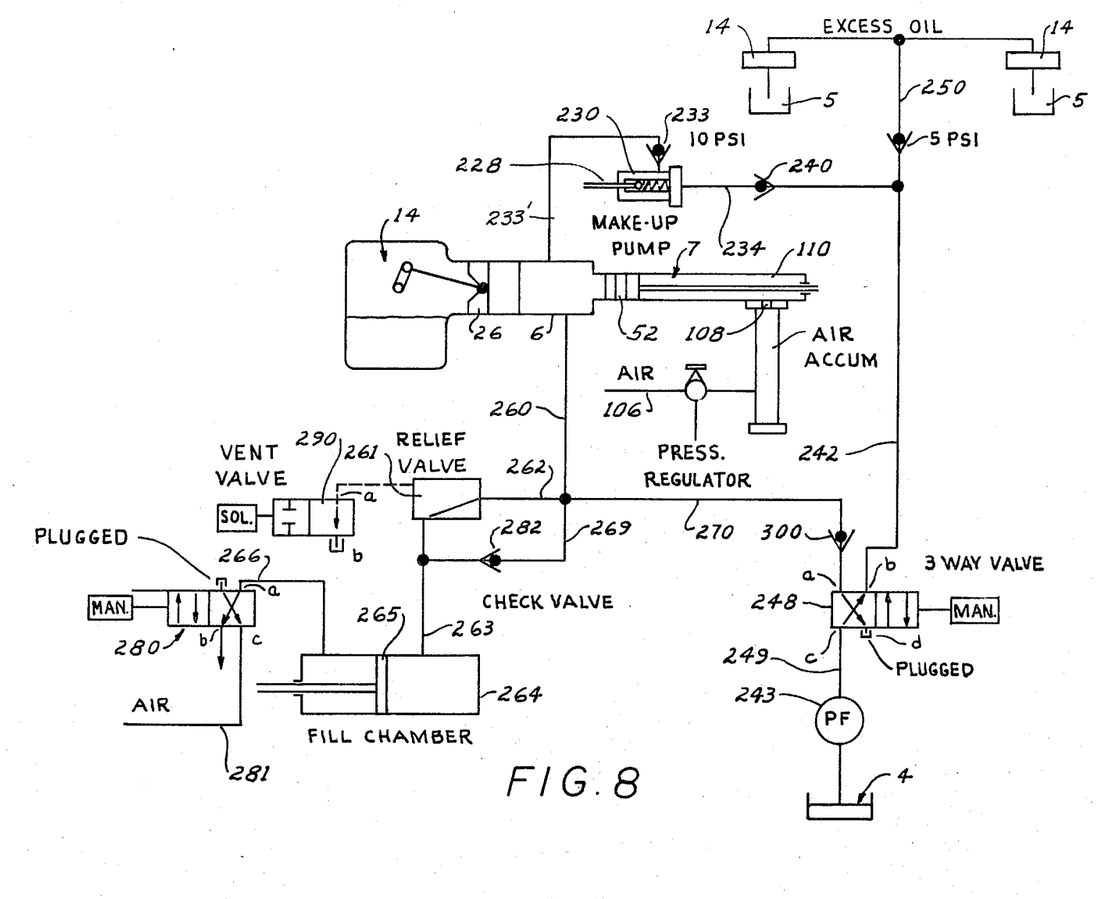
FIG. 8 is a schematic view illustrating one suitable type of control system for the apparatus shown in FIGS. 1–7.
Figure 9:
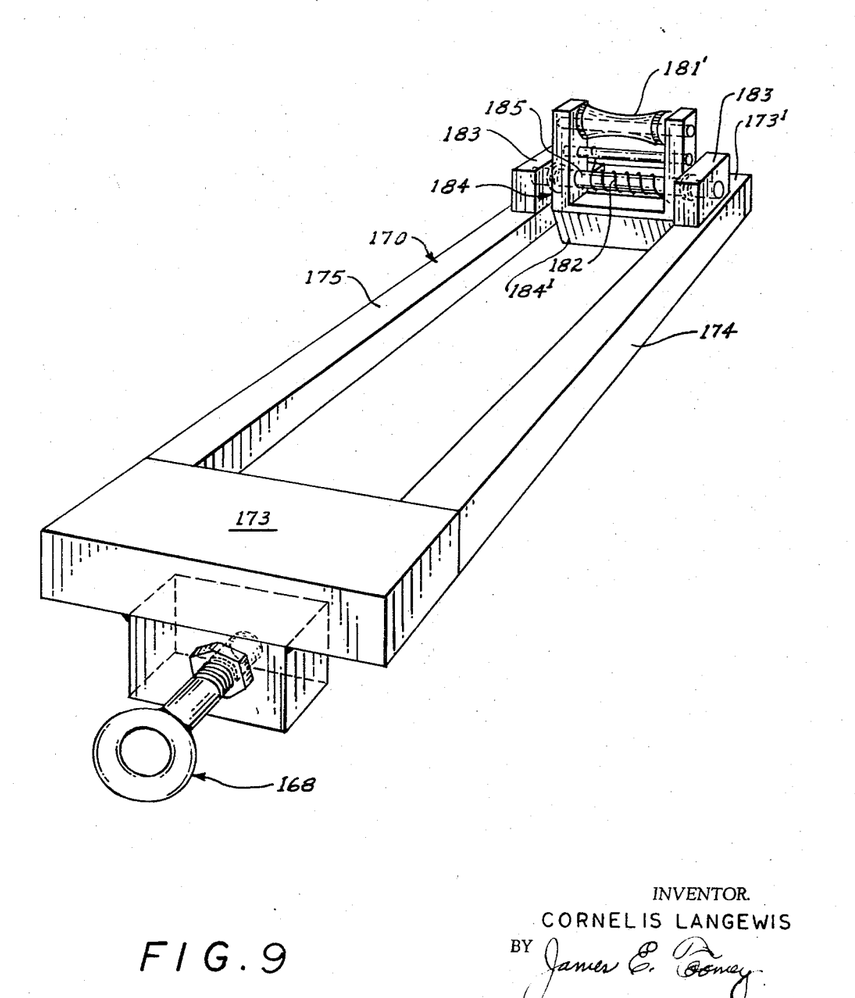
FIG. 9 is a perspective view of the cup feeder for the apparatus of the instant invention.

The general operation of the instant apparatus will now be described, reference being made to the schematic control arrangement shown in FIG. 8 of the drawings. When the motor 44 is energized, it causes actuation of drive shaft 28 for the crank assembly 14. As the crank assembly operates, it causes in conjunction with the air being forced under pressure through the orifice means 108 into the opening 110 of cylinder barrel 7 reciprocal movement of the forming ram 58 in and out of the cylinder barrel 7 and into and out of the die assembly 104. Each time the ram begins to move through the die assembly 104, it picks up a cup-shaped blank W which has been dropped through the feed opening 199 and moved into a ram-engaging position by the slide 170. As the ram engages the blank W, it first causes the blank to fit loosely but snugly over the nose portion 116 of the redraw die 114 and then to be reversely drawn or turned inside out and finally to be ironed during passage through the ironing dies 118 and 122 in a single uninterrupted stroke of the ram.

Special means have been provided to compensate for leakage in the fluid-operating system, such as leakage in the hydraulic multiplier or fluid disposed in the secondary chamber 6. These means include a button 230 on the plug 54 disposed in the one extremity of the hollow piston rod 50. This button is adapted to contact and actuate the lever arm 226 when fluid leakage in chamber 6 allows air in chamber 110 to cause piston 52 to back up beyond its normal initial starting position or position of rest. Actuation of arm 226 causes a depression of the spring biased plunger 228 in the hollow fitting or metering device 230 mounted in the top of the cast housing. Metering device 230 is provided with a reservoir of fluid by virtue of line 234. Makeup fluid is maintained under constant pressure in the line 234, which contains the one-way, ball-type check valve 240, by virtue of being connected to line 242. Line 242 leads to a three-way, hand-operated valve 248 and one of the ports of valve 248 is connected by a line 249 to a makeup pump 243 operated by a motor 244. Makeup pump 243 receives fluid from the makeup reservoir or chamber 4 which is connected to the chamber 5 through the drip orifice 246. Pump 243 can pump makeup oil or fluid into lines 242 and 234 by means of the three-way valve 248, when valve 248 has been manipulated such that ports b and c are connected to each other and port a is connected to the plugged port d. With valve 248 in this position, fluid can pass from pump 243, line 249, valve 248 and into lines 242 and 234.

Thus upon depression and actuation of lever 226 the fluid contained in the chamber of metering device 230 is ejected therefrom through check valve 233 and line 233' into chamber 6 under the influence of plunger 228 as the spring biased plunger 228 is motivated in the manner of a piston by means of lever 226. Inasmuch as makeup fluid will usually be required only occasionally, although it must be constantly held in reserve, some means must be provided to effect a by-passing of makeup oil with respect to line 234. This is effected by means of line 250 which branches off into two leads to chamber 5, each lead being located adjacent a bearing for one of the crank arm assembly shafts 15 and 16 whereby a constant lubrication of these bearings can be advantageously provided. The fluid in the chamber 5 then passes ultimately through port 246 into the makeup chamber 4. A safety mechanism is also provided to prevent damage to the apparatus in the event that a cup is mis-fed or misaligned with the punch such that a jamming and freeze-up of the punch and workpiece occurs in the die assembly 104. When a jam-up occurs, the fluid in the cavity or fluid coupling chamber 6 is permitted to back up through line 260 located in the casting 3 whence it will pass through a conventional balanced piston type relief valve 261, lines 262 and 263 into the fluid accumulator 264. Accumulator cylinder 264 contains a piston 265. As fluid from line 263 enters the head end of the fill chamber or accumulator 264 it forces piston 265 to move to the left as viewed in the drawings and a simultaneous evacuation of air from the rod side of the accumulator into line 266. Line 266 is normally connected to a two-position, four-way manually operated valve 280. When the ports a and b of the valve are connected line 266 will be connected to the atmosphere to permit full venting of the air from accumulator 264. Connection of ports a and c of valve 280 will connect air line 281 with line 266 for the purpose of evacuating fluid from the head end of accumulator 264 when desired, such as when the defective workpiece has been removed and operation of the machine reinitiated. It is to be understood of course that when a malfunction of the type described occurs, a suitable visual or audible alarm can also be activated if desired, whereby the operator will be given the opportunity to stop the operation of the machine to remove the defective workpiece.

After the defective blank has been removed the manual control valve 280 as noted above is operated such that ports a and c are connected whereby the piston in accumulator 264 will cause the previously dumped fluid from chamber 6 to move back into chamber 6 through the medium of lines 263, valve 282 and lines 269 and 260 while by-passing relief valve 261.

In the event the operator for any reason wishes to dump all of the oil in chamber 6, he can operate the solenoid controlled vent valve 290 in such a fashion that ports *a* and *b* of the valve 290 are connected thereby unbalancing the piston in valve 261 so that valve 261 can then permit the filling of accumulator 264 with the fluid from chamber 6 in the manner previously described.

Valve 248 is advantageously employed during the initial filling of chamber 6 with fluid. At this time ports *a* and *c* of the valve 248 are connected by the proper manipulation thereof so fluid can be passed from chamber 4 through 248, check valve 300 and lines 270 and 260. Finally the various chambers 4 and 5 are initially filled with fluid through the port 302 in the cast housing 3. This same port 302 is advantageously used as a vent during operation of the machine and can be provided at that time with a removable air filtering device 304.

An advantageous embodiment of the invention has been show and described. It is obvious that various changes and modifications may be made therein without departing from the spirit and scope thereof, as defined in the appended claims, wherein what is claimed is:

1. An apparatus for forming seamless can bodies and the like from shallow cup-shaped workpieces, comprising the combination of stationary die means and a punch for drawing a workpiece through said die means; said die means including a stationary reverse redraw die aligned with and disposed adjacent the entry end of said die means for initially receiving and centering said workpiece with respect both to said punch and die means prior to the entrance of said punch and said workpiece into said forming die means; means for actuating said punch in such a fashion as to minimize off-centering said punch with respect to said die means; said actuating means comprising a piston rod means, the punch being disposed at one extremity of said piston rod means and a working piston disposed on said piston rod means at a point remote from said punch; an actuating piston and a fluid coupling means connecting said actuating piston with said working piston; means for advancing said actuating piston in one direction so as to move said working piston, said piston rod and said punch from preselected starting positions and for effecting passage of said punch along with a workpiece in a single uninterrupted stroke of said punch through said die means; and yieldable means acting upon said working piston for returning the working piston, said piston rod, said punch and said actuating piston to their respective preselected starting positions.

2. An apparatus as set forth in claim 1 wherein said reverse redraw die is provided with a nose piece for initially receiving and centering a shallow cup-shaped workpiece with respect to said punch and said die means.

3. An apparatus as set forth in claim 1, including workpiece-guide means disposed adjacent the entry end of said reverse redraw die, said workpiece-guide means acting to direct the wall of said workpiece about the reverse redraw die as the workpiece is forced through said reverse redraw die by said punch so as to prevent wrinkling of the wall of the workpiece.

4. An apparatus for forming seamless can bodies and the like from shallow cup-shaped workpieces comprising the combination of stationary forming die means, including a stationary reverse redraw die aligned with and disposed adjacent the entry end of said die means; a punch for advancing a shallow cup-shaped workpiece through said forming die means; said reverse redraw die being provided with nose means for initially receiving and centering said workpiece with respect to said punch and forming die means as said workpiece and punch are advanced through said forming die means; reciprocating feeder means operable in timed relationship to the movements of said punch for positioning a workpiece intermediate said punch and forming die means prior to the advance of said punch through said forming die means; and means for actuating said punch in such a fashion as to minimize off-centering of the punch with respect to said die means during its passage therethrough; said actuating means comprising a piston rod means having the punch disposed at one extremity thereof and a working piston located on said piston rod means at a point remote from said punch, an actuating piston and a fluid coupling means connecting said actuating piston with said working piston, driving means for advancing said actuating piston in one direction so as to move said working piston, said piston rod means and said punch from preselected starting positions and for causing passage of said punch and the cup-shaped workpiece in a single uninterrupted stroke of said punch through said forming die means; and yieldable means acting upon said working piston and operable upon the passage of the punch and workpiece through said forming die means for withdrawing said punch from the forming die means and for returning the working piston, said piston rod means said punch and said actuating piston to their respective preselected starting positions.

5. An apparatus for forming containers and the like comprising the combination of forming dies including a reverse redraw die disposed adjacent the entry end of said dies; a punch for advancing a shallow cup-shaped workpiece through said forming dies; said reverse redraw die being provided with a nose portion for initially receiving and centering said shallow cup-shaped workpiece relative to said punch and forming dies during the initial advance of the workpiece and punch through said forming dies; means for actuating the punch in such a fashion as to minimize off-centering of the punch relative to said dies during the movement of the punch and workpiece therethrough; said actuating means comprising a piston rod means having the punch disposed at one extremity thereof and a working piston located on said piston rod means at a point remote from said punch, an actuating piston and fluid coupling means connecting said actuating piston with said working piston, drive means for advancing said actuating piston in one direction so as to move said working piston, said piston rod means and said punch from preselected starting positions and for effecting passage of said punch and the workpiece through said forming dies; means maintaining a fluid under pressure intermediate said punch and working piston whereby said fluid can act upon said working piston and operate upon passage of the punch and workpiece through said forming dies to withdraw said punch from the forming dies and return said punch said working piston and said actuating piston to their respective preselected starting positions; said fluid maintaining means including a cylinder means within which the punch, said working piston and said piston rod means are mounted and said punch and piston rod means all being provided with intercommunicating bore means open to the atmosphere; and bleed-off means connecting said bore means with the interior of the cylinder means for bleeding off some of the fluid from said cylinder means and into the said intercommunicating bore means of said punch and piston rod means.

6. An apparatus for forming seamless can bodies and the like from shallow cup-shaped workpieces comprising the combination of stationary forming dies including stationary reverse redraw die aligned with and disposed adjacent the entry end of said forming dies; a punch for advancing a shallow cup-shaped workpiece through said forming dies; said reverse redraw die being provided with nose means for initially receiving and centering said workpiece relative to said punch and forming dies; means for actuating said punch in such a fashion as to minimize off-centering of the punch with respect to said forming dies; said actuating means comprising a cylinder means, piston rod means provided with the punch at one extremity thereof and a working piston located on said piston means at a point remote from said punch mounted in said cylinder means, a fluid-containing chamber communicating with the interior of said cylinder means, an actuator piston mounted in said chamber and connected through the medium of the fluid in said chamber with the working piston; driving means for advancing said actuator piston, said working piston and punch from preselected starting positions and towards said forming dies and for advancing said punch along with a workpiece through said forming dies in a single uninterrupted stroke of the punch; yieldable means acting upon said working piston and operable upon the passage of the punch and workpiece through said forming dies for withdrawing said punch from the forming dies and for returning the punch, the working piston and actuator piston to their preselected starting positions; and a makeup pump means actuable by said working piston for replenishing the fluid in said fluid-containing chamber upon any loss thereof.

7. An apparatus for forming seamless can bodies and the like from shallow cup-shaped workpieces comprising the combination of a stationary forming die means including a stationary reverse redraw die aligned with and disposed adjacent the entry end of said die means; a punch for advancing a shallow cup-shaped workpiece through said forming die means; said reverse redraw die being provided with nose means for initially receiving and centering said workpiece relative to said punch and forming die means; means for actuating said punch in such a fashion as to minimize off-centering of the punch with respect to said forming die means; said actuating means including a cylinder means, piston rod means provided with the punch at one extremity thereof and a working piston located thereon at a point remote from said punch disposed in said cylinder means, a fluid-containing chamber communicating with said cylinder means; an actuator piston mounted in said chamber and connected through the medium of the fluid in said chamber with the working piston in said cylinder means and drive means for advancing said actuator piston, said working piston and punch from preselected starting positions and towards said forming die means and for advancing said punch along with the workpiece through said forming die means in a single uninterrupted stroke of the punch; yieldable means disposed in said cylinder means acting upon said working piston and operable upon the passage of the punch and workpiece through said forming die means for withdrawing said punch from the die means and for returning the punch, the working piston and actuator piston to their preselected starting positions; and means including a relief valve connected to said fluid-containing chamber for evacuating fluid from said fluid-containing chamber in the event the punch is retarded in its advance toward and through the forming die means.

8. In an apparatus of the type described the combination of a set of forming dies, including a reverse redraw die provided with a nose piece having a bulbous portion disposed adjacent the entry end of said forming dies, a forming ram for drawing a shallow cup-shaped workpiece through said forming dies and resiliently mounted guide means disposed adjacent the bulbous portion of said reverse redraw die for guiding the wall of the workpiece about said bulbous portion of said reverse redraw die as the punch advances the workpiece through said dies so as to prevent wrinkling of the wall of the workpiece, said guide means comprising a plurality of individually and resiliently mounted fingers radially and closely arranged together about the path of travel of the workpiece.

9. An apparatus as set forth in claim 8 wherein said fingers overlap the leading edge of the bulbous portion of the nosepiece of the reverse redraw die.

10. An apparatus for forming seamless can bodies from cup-shaped workpieces comprising the combination of a stationary ironing die means and a punch for moving a workpiece through said ironing die means, a stationary reverse redraw die means aligned with said ironing die means and disposed adjacent the entry end of said ironing die means for initially receiving and centering a cup-shaped workpiece with respect both to the punch and the ironing die means prior to the passage of the punch and the workpiece through said ironing die means and means for actuating said punch and for effecting advancement of said punch along with the workpiece first through said reverse redraw die means and then through said ironing die means in a single uninterrupted stroke of said punch.

11. An apparatus as set forth in claim 10 wherein said reverse redraw die means is provided with a nose piece for initially receiving and centering a cup-shaped workpiece with respect to the punch and ironing die means.

12. An apparatus as set forth in claim 10 including workpiece guide means disposed adjacent the entry end of said reverse redraw die means, said workpiece guide means acting to direct the wall of the workpiece towards the reverse redraw die means as the workpiece is forced through said reverse redraw die means by said punch so as to prevent wrinkling of the wall of the workpiece.

13. An apparatus for forming an elongated seamless can body from a shallow cup-shaped workpiece comprising the combination of stationary ironing die means and stationary reverse redraw die means disposed adjacent the entry end of and aligned with said ironing die means, punch means for forcing the workpiece in a single uninterrupted stroke first through the reverse redraw die means and then through the ironing die means whereby during the passage of the workpiece through the reverse redraw die means a turning of the workpiece inside out and a change in its cross-sectional dimension will be effected, means for actuating said punch means including a piston means, a power source and fluid coupling means connecting said piston means to said power source.

14. In an apparatus of the type described the combination of a set of forming dies, including a reverse redraw die provided with a nosepiece having a bulbous portion disposed adjacent the entry end of said forming dies, a forming ram for drawing a shallow cup-shaped workpiece through said forming dies, resiliently mounted guide means disposed adjacent the bulbous portion of said reverse redraw die for guiding the wall of the workpiece about said bulbous portion of said reverse redraw die as the punch advances the workpiece through said dies so as to prevent wrinkling of the wall of the workpiece, said guide means comprising a plurality of individually and resiliently mounted fingers radially and closely arranged together about the path of travel of the workpiece, and wherein said punch is provided with successive enlarged and reduced portions whereby as the workpiece is drawn through the forming dies the wall of the workpiece will have a thicker wall portion adjacent the open end of the workpiece than in the remaining wall portions thereof.

15. An apparatus for forming an elongated seamless can body from a shallow cup-shaped workpiece comprising stationary reverse redraw die means and stationary ironing die means aligned therewith and comprised of a series of spaced drawing dies of progressively reduced internal diameters, expandable workpiece guide means disposed adjacent the entry end of the reverse redraw die means for engaging a cup-shaped workpiece and for guiding the cup-shaped workpiece through the entry end of said reverse redraw die means and punch means for forcing the cup-shaped workpiece past said guide means and through said reverse redraw die means and then through all of the dies of said ironing die means in a single uninterrupted stroke of the punch means.

16. An apparatus as set forth in claim 15 wherein the reverse redraw die means is provided with orifice means for effecting a reduction in the cross-sectional area of the bottom of the cup-shaped workpiece during passage of the workpiece through the reverse redraw die means.

(References on following page)

References Cited by the Examiner

UNITED STATES PATENTS

| | | | |
|---|---|---|---|
| 560,934 | 5/1896 | Robertson | 60—54.5 |
| 998,968 | 7/1911 | Klocke et al. | 72—350 |
| 1,649,841 | 11/1927 | May | 72—347 |
| 1,942,930 | 1/1934 | Ludington | 113—120 |
| 1,956,989 | 5/1934 | Lapointe | 60—54.5 |
| 1,987,101 | 1/1935 | Fabrice | 113—120 |
| 2,211,009 | 8/1940 | Grotnes | 72—346 |
| 2,261,060 | 10/1941 | Giesler | 72—346 |
| 2,309,181 | 1/1944 | Franck | 72—361 |
| 2,545,570 | 3/1951 | Caldwell | 72—346 |
| 2,581,435 | 1/1952 | Nowak | 60—54.5 |
| 2,609,776 | 9/1952 | Sahlin | 214—1 |
| 2,761,406 | 9/1956 | Schnell | 72—349 |
| 3,060,880 | 10/1962 | Laxo | 113—113 |
| 3,167,044 | 1/1965 | Hendrickson | 113—120 |

FOREIGN PATENTS 625,011  6/1949  Great Britain.

CHARLES W. LANHAM, *Primary Examiner.*
RICHARD J. HERBST, *Examiner.*

UNITED STATES PATENT OFFICE
CERTIFICATE OF CORRECTION

Patent No. 3,314,274　　　　　　　　　　　　　　April 18, 1967

Cornelis Langewis

It is hereby certified that error appears in the above numbered patent requiring correction and that the said Letters Patent should read as corrected below.

Column 4, lines 2 and 3, for "generaly" read -- generally --; line 41, for "it", second occurrence, read -- is --; line 57, for "112" read -- 122 --; column 9, line 1, for "lines", first occurrence, read -- line --; column 10, line 62, after "including" insert -- a --; column 11, line 15, for "actuable" read -- actuatable --.

Signed and sealed this 2nd day of July 1968.

(SEAL)
Attest:

Edward M. Fletcher, Jr.　　　　　　　　　　　　　EDWARD J. BRENNER
Attesting Officer　　　　　　　　　　　　　　　　Commissioner of Patents